(12) United States Patent
Koivisto et al.

(10) Patent No.: US 12,075,316 B2
(45) Date of Patent: Aug. 27, 2024

(54) MOBILE DEVICE WITH PROCESSOR FOR COMMUNICATION WITH NFC READER

(71) Applicant: KONE Corporation, Helsinki (FI)

(72) Inventors: Ari Koivisto, Helsinki (FI); Henry Silvennoinen, Helsinki (FI)

(73) Assignee: KONE Corporation, Helsinki (FI)

( * ) Notice: Subject to any disclaimer, the term of this patent is extended or adjusted under 35 U.S.C. 154(b) by 308 days.

(21) Appl. No.: 17/231,541

(22) Filed: Apr. 15, 2021

(65) Prior Publication Data

US 2021/0235239 A1  Jul. 29, 2021

Related U.S. Application Data

(63) Continuation of application No. PCT/FI2018/050751, filed on Oct. 16, 2018.

(51) Int. Cl.
*H04W 4/33* (2018.01)
*B66B 1/34* (2006.01)
(Continued)

(52) U.S. Cl.
CPC ............ *H04W 4/33* (2018.02); *B66B 1/3461* (2013.01); *B66B 1/468* (2013.01); *G05B 15/02* (2013.01); *G06F 9/44* (2013.01); *H04B 5/77* (2024.01); *H04W 4/021* (2013.01); *B66B 2201/103* (2013.01); *B66B 2201/4615* (2013.01);
(Continued)

(58) Field of Classification Search
CPC ......... H04W 4/33; H04W 4/021; H04W 4/80; B66B 1/3461; B66B 1/468; B66B 2201/103; B66B 2201/4615; B66B 2201/4638; B66B 2201/4653;
(Continued)

(56) References Cited

U.S. PATENT DOCUMENTS

| 8,744,754 B2 * | 6/2014 | Kappeler | ................ B66B 1/468 |
| | | | 701/410 |
| 10,683,190 B2 * | 6/2020 | Chapman | ................ B66B 1/468 |

(Continued)

FOREIGN PATENT DOCUMENTS

| CN | 103476694 A | 12/2013 |
| CN | 104584085 A | 4/2015 |

(Continued)

OTHER PUBLICATIONS

Chinese Office Action and Search Report dated Aug. 31, 2023 for Application No. 201980052464.8.

*Primary Examiner* — Ramesh B Patel
(74) *Attorney, Agent, or Firm* — Birch, Stewart, Kolasch & Birch, LLP

(57) ABSTRACT

According to an aspect, there are provided a mobile device for wireless people flow management. The mobile device comprises at least one processor; at least one memory; and a near field communication, NFC, reader; wherein the at least one memory comprises program code which, when executed on the at least one processor causes the mobile device to receive, from the NFC reader, information encoded in an NFC tag associated with a specific location in a building; determine control information to trigger at least one state change associated with the location based on the information encoded to the NFC tag; and send the control information to a control system of the building.

3 Claims, 1 Drawing Sheet

(51) Int. Cl.
*B66B 1/46* (2006.01)
*G05B 15/02* (2006.01)
*G06F 9/44* (2018.01)
*H04B 5/00* (2024.01)
*H04B 5/77* (2024.01)
*H04W 4/021* (2018.01)
*G01V 8/10* (2006.01)
*G06F 8/60* (2018.01)
*G06M 11/00* (2006.01)
*G07C 9/00* (2020.01)

(52) U.S. Cl.
CPC ........... *B66B 2201/4638* (2013.01); *B66B 2201/4653* (2013.01); *G01V 8/10* (2013.01); *G06F 8/60* (2013.01); *G06M 11/00* (2013.01); *G07C 9/00* (2013.01)

(58) Field of Classification Search
CPC .. G05B 15/02; G06F 9/44; G06F 8/60; H04B 5/0056; G01V 8/10; G06M 11/00; G07C 9/00
See application file for complete search history.

(56) References Cited

U.S. PATENT DOCUMENTS

| | | | |
|---|---|---|---|
| 10,889,463 B2 * | 1/2021 | Chapman | B66B 3/006 |
| 11,697,572 B2 * | 7/2023 | Salmikuukka | B66B 1/468 |
| | | | 187/380 |
| 2012/0253658 A1 * | 10/2012 | Kappeler | B66B 1/3415 |
| | | | 701/410 |
| 2014/0070919 A1 | 3/2014 | Jackson et al. | |
| 2015/0204678 A1 | 7/2015 | Schuster | |
| 2015/0249273 A1 * | 9/2015 | Bradwell | B60L 53/57 |
| | | | 429/102 |
| 2016/0090271 A1 * | 3/2016 | Silvennoinen | B66B 1/468 |
| | | | 187/387 |
| 2018/0208430 A1 * | 7/2018 | Koivisto | H04W 4/80 |
| 2021/0214185 A1 * | 7/2021 | Hiltunen | B66B 3/006 |

FOREIGN PATENT DOCUMENTS

| | | | | |
|---|---|---|---|---|
| EP | 2704105 A1 * | 3/2014 | ............ | B66B 1/468 |
| WO | WO-2016100293 A1 * | 6/2016 | ........... | B66B 1/3461 |

* cited by examiner

MOBILE DEVICE WITH PROCESSOR FOR COMMUNICATION WITH NFC READER

CROSS REFERENCE TO RELATED APPLICATION

This application is a Continuation of PCT International Application No. PCT/FI2018/050751, filed on Oct. 16, 2018, which is hereby expressly incorporated by reference into the present application.

BACKGROUND

Access to premises may be implemented using, for example, Bluetooth based readers associated with a door. The company providing the Bluetooth reader may provide encrypted credentials, for example, to a mobile phone of a user. The Bluetooth reader may then identify the mobile phone and execute some predefined commands assigned to the identity, such as opening the door. A disadvantage of using connected Bluetooth readers and credentials delivered to mobile phones is that it may become an expensive solution.

Also, QR codes may be used by placing a reader on the door and providing QR code data from a mobile device. However, this requires connected readers, and a user needs to activate his phone and find the QR code to present to the reader.

Thus, there is a need for a low-cost and simple solution for managing people flow in buildings.

SUMMARY

According to at least some of the aspects, a solution is provided that enables people flow management, such as opening doors and making elevator calls for users, based on utilizing their own mobile devices. The solution may provide a convenient, simple and low-cost alternative for managing operation of building entities by using cheap near field communication stickers that may be placed around a building.

According to a first aspect, there is provided a mobile device. The mobile device comprises at least one processor, at least one memory and a near field communication (NFC) reader. The at least one memory comprises program code which, when executed on the at least one processor causes the mobile device to receive, from the NFC reader, information encoded in an NFC tag associated with a specific location in a building; determine control information to trigger at least one state change associated with the specific location based on the information encoded in the NFC tag; and send the control information to a control system of the building.

In an embodiment, the control information comprises the information encoded in the NFC tag.

In an embodiment, in addition or alternatively, the control information further comprises user identification information associated with the mobile device.

In an embodiment, in addition or alternatively, the control information comprises an origin-destination call based on the user identification information and location associated with the NFC tag.

In an embodiment, in addition or alternatively, the control information comprises instructions to open an entrance associated with the location.

In an embodiment, in addition or alternatively, the control information comprises an elevator call.

In an embodiment, in addition or alternatively, the at least one memory comprises program code which, when executed on the at least one processor further causes the mobile device to receive instructions associated with the at least one state change for the user from the control system of the building; and display the instructions to the user.

According to a second aspect, there is provided a control system of a building. The control system comprises at least one processor and at least one memory. The at least one memory comprises program code which, when executed on the at least one processor, causes the control system to receive control information associated with a NFC tag associated with a specific location in the building; and control at least one state change associated with the specific location based on the control information.

In an embodiment, the at least one memory stores data comprising one or more NFC tag identity and location information associated with each NFC tag entity, and the at least one memory comprises program code which, when executed on the at least one processor, causes the control system to determine an NFC tag identity from the at least one memory based on the received control information, determine location information corresponding to the NFC tag identity, and control the at least one state change associated with the determined location information.

In an embodiment, in addition or alternatively, the control information comprises user identification information, and the at least one memory comprises program code which, when executed on the at least one processor, causes the control system to determine the at least one state change associated with the determined location information based on the user identification information and control information.

In an embodiment, in addition or alternatively, the at least one state change comprises opening an entrance or making an elevator call.

In an embodiment, in addition or alternatively, the at least one state change comprises making an origin-destination call.

In an embodiment, in addition or alternatively, the control system comprises an elevator control system.

According to a third aspect, there is provided a system for people flow management in a building. The system comprises a near field communication (NFC) tag configured to store information associated with a specific location in the building; a mobile device according to the first aspect; and a control system of the building according to the second aspect.

According to a fourth aspect, there is provided a method comprising: receiving, from a near field communication, NFC, reader, information encoded in an NFC tag associated with a specific location in a building; determining control information to trigger at least one state change associated with the specific location based on the information encoded in the NFC tag; and sending the control information to a control system of the building.

According to a fifth aspect, there is provided a method comprising: receiving control information associated with a near field communication, NFC, tag associated with a specific location in the building; and controlling at least one state change associated with the specific location based on the control information.

According to a sixth aspect, there is provided a computer program comprising program code instructions which, when executed by at least one processor, perform the method of the fourth aspect.

In an embodiment, the computer program is embodied on a computer-readable medium.

According to a seventh aspect, there is provided a computer program comprising program code instructions which, when executed by at least one processor, perform the method of the fifth aspect.

In an embodiment, the computer program is embodied on a computer-readable medium.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
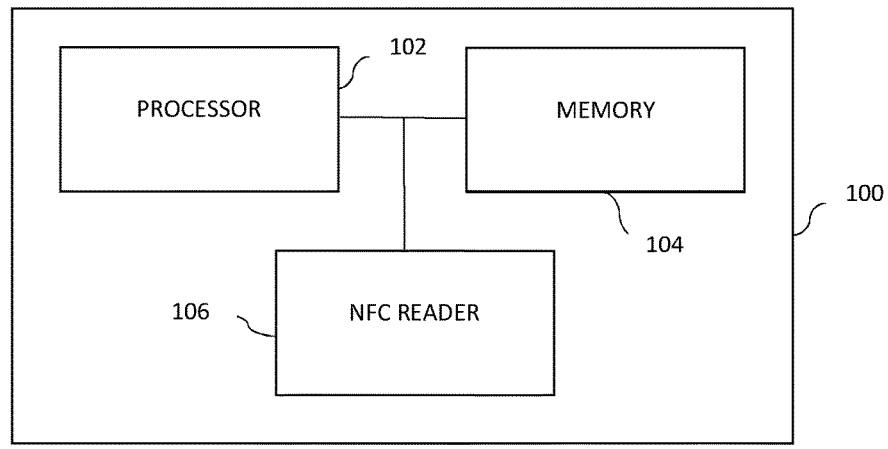
FIG. 1 illustrates a mobile device comprising a NFC reader according to an embodiment.

FIG. 1 illustrates a mobile device 100 according to an embodiment. The mobile device 100 enables remote and wireless people flow management in buildings.

The mobile device 100 comprises at least one processor 102, at least one memory 104, and a near field communication (NFC) reader 106. The at least one memory 104 comprises program code which, when executed on the at least one processor 102 causes the mobile device 100 to receive from the NFC reader 106 information encoded in a NFC tag associated with a specific location in a building, determine control information to trigger at least one state change associated with the location based on the information encoded in the NFC tag, and send the control information to a control system of the building.

In an embodiment, instead of NFC communication and the NFC reader, other short-range radio communication techniques and associated tags and readers may be used.

For example, one or more NFC tags may be placed around a lobby of the building. The NFC tags may be, for example, in the form of stickers. Each NFC tag may have an individual identity code encoded in them. Each of the identity codes may have a corresponding specific location information stored in a register. For example, a NFC sticker may be placed by an entrance door in the lobby. Specific location information may comprise, for example, distance from a specific door to an elevator, exact geographical coordinates and/or other information specifying the location of the door, such as an identifier "door A".

In an example, the location information may also be encoded in each NFC tag. The location information may also comprise the distance from the tag to the elevator expressed in time, i.e. an estimated time of the user to walk from the tag to the elevator.

The NFC stickers may be placed by any entrance such as doors, turnstiles and so on. In addition, the stickers may be placed on any device or a wall.

After receiving the information encoded to the NFC tag, the mobile device 100 may determine control information to trigger at least one state change associated with the specific location. The control information may comprise, for example, instructions to open an entrance. As an example, if the NFC tag is placed in connection with a door, the control information may comprise instructions to open the correct door.

As another example, the control information may comprise, in addition or alternatively, instructions to make an elevator call. Because the NFC tag is associated with a specific location, a distance from the tag to an elevator at a specific floor is known. Thus, the control information may comprise instructions for an elevator to pick up the user from this floor at a right time. This enables minimizing waiting time for the user and making a remote elevator call automatically by reading a NFC tag in the lobby. Thus, the mobile device 100 may act as an elevator call giving device. In another example, NFC tags, for example, in a lobby may be used to enable up and down elevator calls. Although multiple NFS tag may be associated with the same specific location (in this example, to the lobby area at a specific floor), a first set of NFC tags may be used to cause an upward call and a second set of NFC tags may be used to cause a downward call.

In an embodiment, the control information may also comprise user identification information. The user identification information may be used, for example, to allow or deny access for the user, for example, when the NFC tag is placed by an entrance. Further, the user identification information may be used for determining user-specific elevator calls, for example, to enable individual origin-destination elevator calls. For example, based on the user identification information and the information from the NFC tag, the control information may comprise instructions to make an elevator call from the current floor to an office floor of the user. This allows implementing a solution in which a single NFC tag may be used to cause user specific actions. Using the elevator example, for each user the NFC tag may cause a user-specific origin-destination elevator call.

In an embodiment, the control information may comprise the information stored in the NFC tag. The mobile device 100 may thus forward the received information to the control system without first processing the information. In another embodiment, the mobile device 100 may process the received information before sending the determined control information to the control system of the building.

In an embodiment, the at least one memory 104 may comprise program code which, when executed on the at least one processor 102 further causes the mobile device 100 to receive instructions associated with the at least one state change for the user from the control system of the building and display the instructions to the user. For example, the mobile device 100 may receive instructions to indicate to the user that a door is now open or guide the user to the right elevator.

The disclosed solution enables creating elevator call giving stations and managing access control anywhere in a building for nearly no cost by using the users' own mobile devices. Reading the NFC tag does not require any application to be activated on the mobile device. Also, by using NFC readers incorporated in mobile devices, there is no need for costly specialized readers. The disclosed solution also provides a reliable and convenient way of determining the exact location of a user in a building. Further, using the solution it is possible to know that the user intentionally wants something to happen as a result of placing the mobile device in vicinity of the NFC tag. If an event was triggered only based on location information of the user (without the reading initiated by the user), it would be uncertain whether the user wanted to, for example, open a door or if the user just happened to be standing next to the door.

Figure 2:
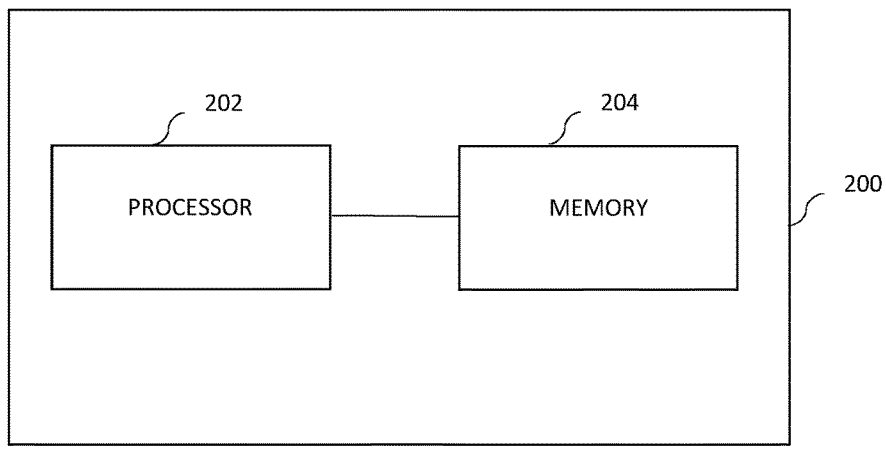
FIG. 2 illustrates a control system of a building according to an embodiment.

FIG. 2 illustrates a control system 200 of a building according to an embodiment.

The control system 200 comprises at least one processor 202 and at least one memory 204. The at least one memory 204 comprises program code which, when executed on the at least one processor 202 causes the control system 200 to receive control information associated with an NFC tag associated with a specific location in the building and to control at least one state change associated with the specific location based on the control information.

In an embodiment, the control information may comprise identity information of the read NFC tag. The at least one memory 204 may store data comprising one or more NFC tag identity and location information corresponding to each NFC tag identity. The control system 200 may determine an NFC tag identity from the at least one memory based on the received control information. Thus, it is able to determine also location information corresponding to the NFC tag identity. The control system 200 is then able to control the at least one state change associated with the determined location information.

Based on the location, the control system 200 may, for example, determine to open a door or turnstile. As another example, the control system 200 may determine an elevator call based on the control information. Because the control information is associated to a specific location, the control system 200 is able to know the current floor of the user, and the control system 200 may also know or calculate an estimated time of arrival of the user to the elevator. Thus, waiting time of the elevator may be minimized. In an embodiment, the control system 200 may comprise an elevator control system allocating elevator calls to one or more elevators.

In an embodiment, the control information may comprise user identification information. The control system 200 is then able to determine the at least one state change associated with the determined location information based on the user identification information and control information. This enables a solution where the NFC tags can be used as an access control system. In other words, the control system 200 may determine to allow or deny access through an entrance at a specific location based on the user identification information. As another example, based on the user identification information, the control system 200 may determine an origin-destination call as the control system 200 may beforehand know both the origin floor and the most probable destination floor of the user.

Figure 3:
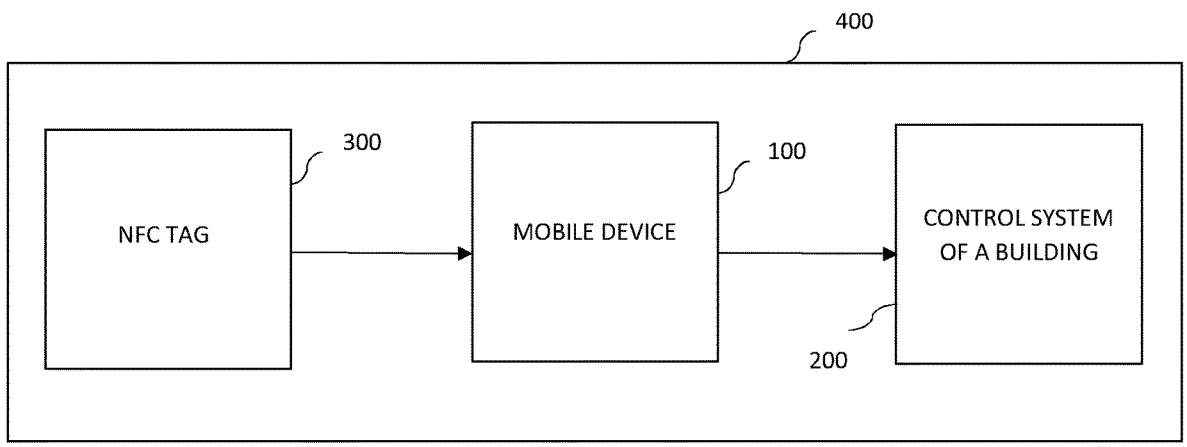
FIG. 3 illustrates a system for people flow management in a building according to an embodiment.

FIG. 3 illustrates a system 400 for people flow management according to an embodiment.

The system 400 comprises a NFC tag 300 configured to store encoded information associated with a specific location in the building, a mobile device 100 as illustrated in FIG. 1, and a control system 200 of the building as illustrated in FIG. 2. In an embodiment, the system 400 may comprise a plurality of NFC tags.

Further, according an aspect, there is provided a method comprising: receiving, from a near field communication, NFC, reader, information encoded in an NFC tag associated with a specific location in a building; determining control information to trigger at least one state change associated with the specific location based on the information encoded in the NFC tag; and sending the control information to a control system of the building. The method may be implemented using a computer program executed by the mobile device 100.

Further, according an aspect, there is provided a method comprising: receiving control information associated with a near field communication, NFC, tag associated with a specific location in the building; and controlling at least one state change associated with the specific location based on the control information. The method may be implemented using a computer program executed by the control system 200.

The exemplary embodiments and aspects of the invention can be included within any suitable device, for example, including, servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same state change in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-state change clauses are intended to cover the structures described herein as performing the recited state change and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A mobile device comprising:
   at least one processor;
   at least one memory; and
   a near field communication, NFC, reader;
   wherein the at least one memory comprises program code which, when executed on the at least one processor causes the mobile device to:
   receive, from the NFC reader, identity information of an NFC tag encoded in the NFC tag associated with a specific location in a building;
   determine control information to trigger at least one state change associated with the specific location based on the information encoded in the NFC tag, the control information comprising the identity information of the NFC tag; and
   send the control information to a control system of the building.

2. The mobile device of claim 1, wherein the control information further comprises user identification information associated with the mobile device.

3. The mobile device of claim 1, wherein the at least one memory comprises program code which, when executed on the at least one processor, further causes the mobile device to:
   receive instructions associated with the at least one state change for the user from the control system of the building; and
   display the instructions to the user.

\* \* \* \* \*